United States Patent [19]

Kiba et al.

[11] 4,278,286
[45] Jul. 14, 1981

[54] DEVICE FOR MOUNTING THE MOLDING OF A BONDED TYPE WINDSHIELD

[76] Inventors: Gunji Kiba; Hiroyuki Mizuno, both of Nai No. 2, Kiriharo-cho, Fujisawa-shi, Kanagawa-ken, Japan

[21] Appl. No.: 665,659

[22] Filed: Mar. 14, 1976
(Under 37 CFR 1.47)

[30] Foreign Application Priority Data

Mar. 10, 1975 [JP] Japan .................................. 50-31148
Dec. 19, 1975 [JP] Japan ................................ 50-170520

[51] Int. Cl.³ .............................................. B60J 1/02
[52] U.S. Cl. ......................................... 296/93; 52/718
[58] Field of Search .................... 296/93; 52/718, 716, 52/717, 397

[56] References Cited
U.S. PATENT DOCUMENTS 3,107,939  10/1963  Meyer ................................... 296/93
3,155,422  11/1964  Campbell ............................. 296/93
3,478,476  11/1969  Kemp .................................... 296/93

Primary Examiner—Robert R. Song
Attorney, Agent, or Firm—William A. Drucker

[57] ABSTRACT

A device for mounting a windshield molding to a bonded-type windshield has an interposing member for securing to the glass and to a window frame, and a resiliently deformable fixing member to be engaged on the interposing member and serving to mount the windshield molding. The interposing member includes a holding portion adapted to support the windshield glass and to be secured to the window frame by a bonding agent, and a snug fit portion which is integrally formed with the holding position. The fixing member includes a first groove which receives the snug fit portion of the interposing member, for securing the two items together. The fixing member further has at least one second groove to receive and securely hold a portion of the windshield molding.

10 Claims, 16 Drawing Figures

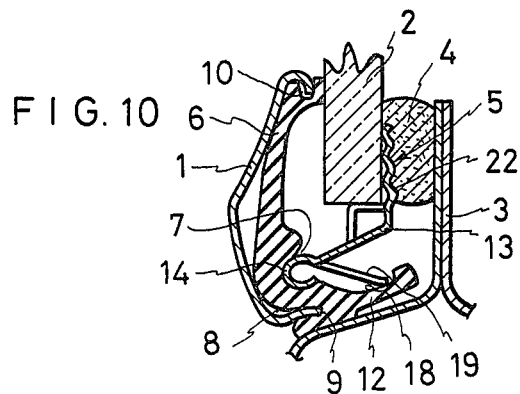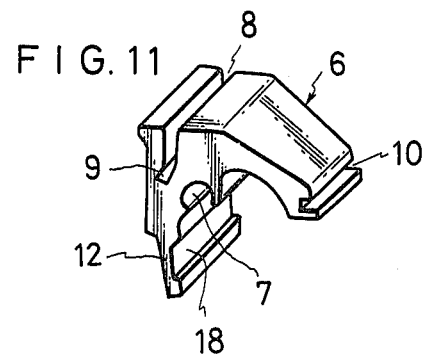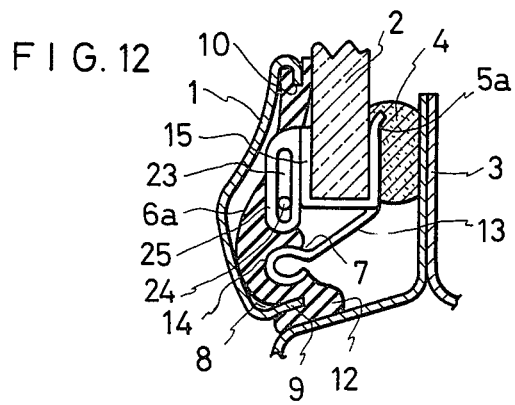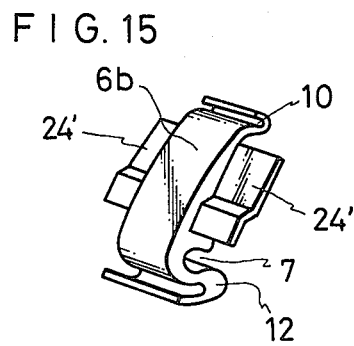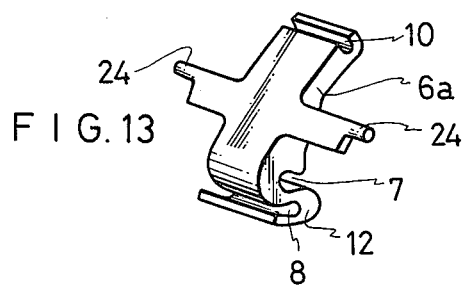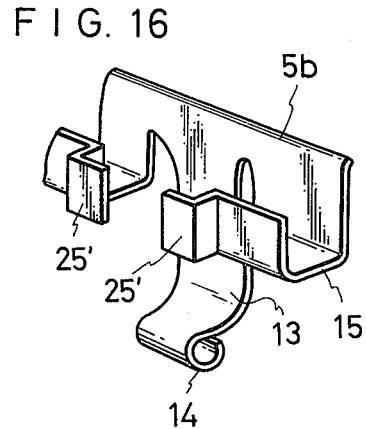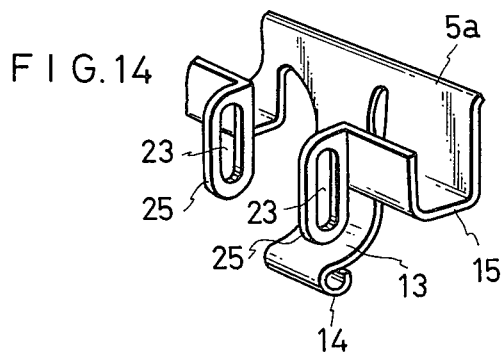

DEVICE FOR MOUNTING THE MOLDING OF A BONDED TYPE WINDSHIELD

This invention relates to improvements in the molding mounting portion of a bonded type windshield in a car.

Heretofore, a system in which a windshield glass is bonded and fixed to a window frame with a bonding agent has been known. A windshield molding mounted in the case of the bonding and fixing system has a structure in which it is in contact with the window frame or the body surface. The system therefore has the drawbacks that the vibrations etc. of the car give forth noises at the part of the contact between the windshield molding and the body surface and that they make flaws in the body surface to cause rust therefrom. Further disadvantages are that the number of constituent parts is large, that the number of stages of the mounting work increased in vain, and that if a dimensional error occurs, it needs to be corrected, so a smooth and prompt assemblage is impossible.

This invention provides mounting device which has solved the problems of preventing the noises and the flaws in body surface which may arise due to contact between the windshield molding and the window frame, of absorbing the dimensional errors of the windshield glass, the window frame etc. in the assemblage so as to facilitate the assembly operation, and of achieving a reduction of cost owing to decrease in the number of constituent parts.

Another object of this invention is to reliably hold the windshield molding by disposing a restraint structure which prevents the mounted molding from floating away from the surface of the windshield glass.

Some embodiments of the device according to this invention will be described with reference to the accompanying drawings in which.

Figure 1:
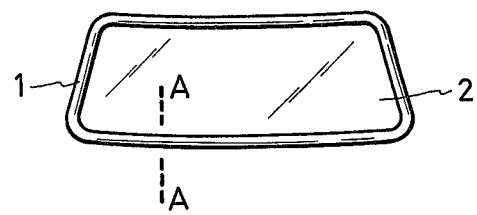
FIG. 1 is a front view of a car window mounted by the device of this invention.
Figure 5:
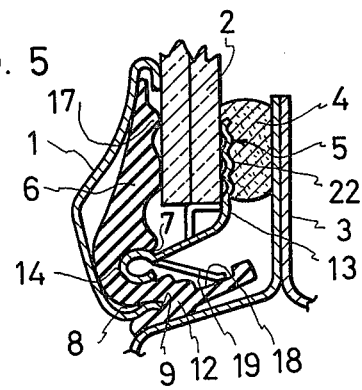
Figure 6:
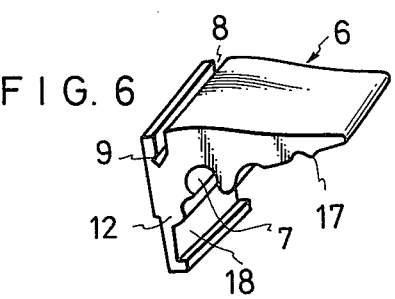
Figure 4:
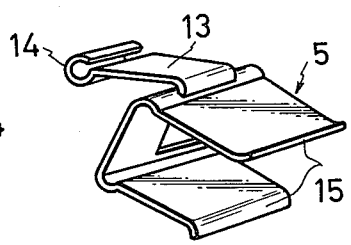
Figure 7:
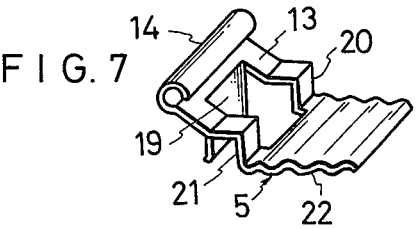
Figure 8:
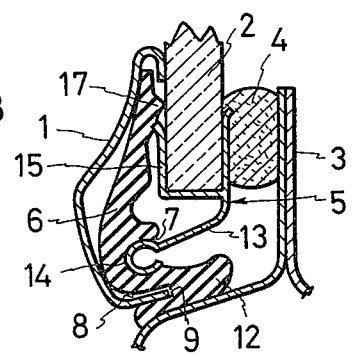
Figure 9:
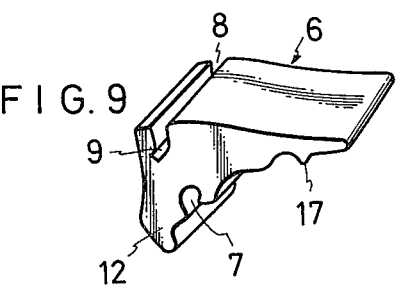

FIG. 4 is a perspective view of a windshield glass interposing member for use in the first embodiment, FIG. 5 is a sectional view of a second embodiment of the device of this invention as taken along the line A—A in FIG. 1, FIG. 6 is a perspective view of a windshield molding fixing member for use in the second embodiment, FIG. 7 is a perspective view of a windshield glass interposing member for use in the second embodiment, FIG. 8 is a sectional view of a third embodiment of the device of this invention as taken along the line A—A in FIG. 1, FIG. 9 is a perspective view of a windshield molding fixing member for use in the third embodiment, FIG. 10 is a sectional view of a fourth embodiment of the device of this invention as taken along the line A—A in FIG. 1, FIG. 11 is a perspective view of a windshield molding fixing member for use in the fourth embodiment, FIG. 12 is a sectional view of a fifth embodiment of the device of this invention as taken along the line A—A in FIG. 1, FIG. 13 is a perspective view of a windshield molding fixing member for use in the fifth embodiment, FIG. 14 is a perspective view of a windshield glass interposing member for use in the fifth embodiment, FIG. 15 is a perspective view showing another structure of the windshield molding fixing member for use in the fifth embodiment, and FIG. 16 is a perspective view showing another structure of the windshield glass interposing member for use in the fifth embodiment.

In FIG. 1, numeral 1 designates a windshield molding which is mounted around a windshield glass 2 by the device of this invention.

Figure 2:
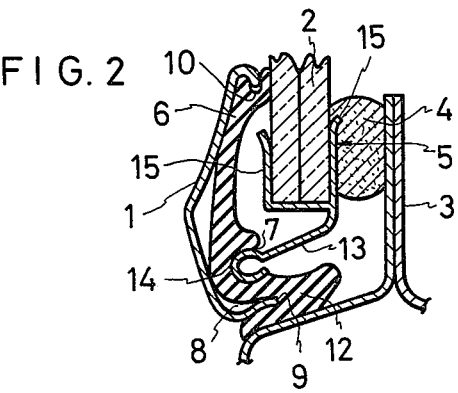
FIG. 2 is a sectional view of a first embodiment of the device of this invention as taken along a line A—A in FIG. 1.
Figure 3:
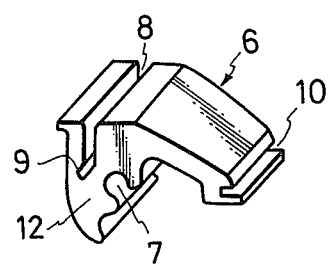
FIG. 3 is a perspective view of a windshield molding fixing member for use in the first embodiment.

FIGS. 2 to 4 show the first embodiment of the device of this invention. It is constructed of a windshield glass interposing member (for interposing or holding the windshield glass between this member and a windshield molding fixing member to be stated below) 5 (refer to FIG. 4) which consists of a sandwiching portion 15 for sandwiching the peripheral edge of the windshield glass 2 therein, and a resilient bracket 13 made for example by cutting and raising a side part of the sandwiching portion 15 and having a snug fit portion 14 formed by curling the fore end of the bracket 13; and a windshield molding fixing member 6 (refer to FIG. 3) which is molded of rubber or a synthetic resin and which is provided with grooves 8 and 10 for fixing the windshield molding 1, a groove 7 adapted to snugly fit the curled snug fit portion 14 of the windshield glass interposing member 5, and a press fit portion 12 capable of elastic deformation. The groove 8 for fixing the windshield molding 1 should desirably be formed with an engaging portion 9 with its inner end bent.

The assembly of the first embodiment of this invention made up of the above constituent elements will be explained with reference to FIG. 2. A plurality of windshield glass interposing members 5 are attached to the peripheral edge of the windshield glass 2 at suitable intervals. That is, the sandwiching portion 15 formed in the windshield glass interposing member 5 is snugly put on the peripheral edge of the windshield glass 2. Then, the windshield glass interposing member 5 is set on a window frame 3 and bonded and fixed thereto by a bonding agent 4. Thereafter, the windshield molding fixing member 6 is snugly fixed through its groove 7 to the snug fit portion 14 at the fore end of the bracket 13 which is provided in the windshield glass interposing member 5. Some dimensional error at the attachment of the windshield molding fixing member 6 is absorbed by the resilience of the bracket 13, the press fit portion 12 of the windshield molding fixing member 6 being pressedly contacted with the surface of the window frame 3 by the elastic force of the bracket 13, whereafter the state of attachment is firmly held by the elastic deformation of the press fit portion 12 itself. Further, the windshield molding fixing portion 6 abuts against the outer surface of the windshield glass 2 at the upper end thereof and urges the windshield glass 2 in the bonding direction.

Subsequently, the windshield molding 1 is attached to the secured windshield molding fixing member 6. That is, the windshield molding 1 is attached through the grooves 8 and 10 which are provided in the windshield molding fixing member 6. One end of the windshield molding 1 as snugly inserted in the groove 8 is bent so as to correspond with the bent engaging portion 9 formed at the inner end of the groove 8, and is engaged with the engaging portion 9 to be restrained from coming off.

The second embodiment will now be described with reference to FIGS. 5 to 7. The windshield glass interposing member 5 has a corrugated windshield glass supporting portion 22 which abuts against one side surface of the windshield glass 2, windshield glass supporting portions 20 and 21 which abut against an end surface of the windshield glass 2, a bracket 13 which extends from the windshield glass supporting portions 20 and 21, and a snug fit portion 14 which is formed in the shape of a curl at the fore end of the bracket 13. Further, it has a pressing piece 19 which is formed by cutting and raising a part of the bracket 13. (Refer to FIG. 7.)

The windshield molding fixing member 6 has a groove 7 which snugly fits the snug fit portion 14 provided in the windshield glass interposing member 5, an engaging portion 9 which serves to attach the windshield molding 1, and a pressing portion 17 which abuts against the surface of the windshield glass 2 (Refer to FIG. 6).

The assembly of the second embodiment made up of the above constituent elements will be explained with reference to FIG. 5. The windshield glass 2 is interposed or held between the windshield glass interposing member 5 and the windshield molding fixing member 6 at suitable intervals along the peripheral edge thereof. That is, the windshield molding fixing member 6 is snugly fixed through its groove 7 to the snug fit portion 14 which is provided in the windshield glass interposing member 5. Thus, the pressing piece 19 is snugly inserted into a slot 18 in the inner surface of the press fit portion 12 and presses the portion 12 downwards. Accordingly, the pressing portion 17 turns towards the outside surface of the windshield glass 2 with the fulcrum at the snug fit portion 7, the windshield glass 2 is interposed or held between the pressing portion 17 and the corrugated windshield glass supporting portion 22 formed in the windshield glass interposing member 5, and the end surface of the windshield glass 2 is supported by the windshield glass supporting portions 20 and 21. The state of interposition of the windshield glass 2 is substantially the same aspect as in the case of sandwiching it in the sandwiching portion 15 in the first embodiment. The windshield glass 2 and the window frame 3 are fixed by the bonding agent 4.

Futher, the windshield molding 1 has the lower end snugly inserted in the groove 8 of the windshield molding fixing member 6 and held in engagement with the engaging portion 9. The upper end is inserted into the interspace between the pressing portion 17 and the windshield glass 2 and is pressedly secured to the surface of the windshield glass 2.

Also in the case of the second embodiment, the bracket 13 acts owing to the elasticity to absorb the mounting dimensional error and to pressedly fix the press fit portion 12 of the windshield molding fixing member 6 to the window frame 3.

The third and fourth embodiments will now be described with reference to FIGS. 8 to 11. As illustrated in FIGS. 8 and 9, the third embodiment is such that the shape of the windshield molding fixing member 6 of the first embodiment is altered. More specifically, the groove 10 in the windshield molding fixing member 6 of the first embodiment as shown in FIG. 3 is done away with, and the pressing portion 17 which abuts against the surface of the windshield glass 2 is formed. As illustrated in FIGS. 10 and 11, the fourth embodiment is such that, in the windshield molding fixing member 6 of the second embodiment, the pressing portion 17 is done away with, while the groove 10 for fixing the windshield molding is formed.

The fifth embodiment of the device of this invention will now be described with reference to FIGS. 12 to 16.

In FIGS. 12 to 14, a windshield glass interposing member (for interposing or holding the windshield glass between this member and a windshield molding fixing member to be stated below) 5a consists of a sandwiching portion 15 which is so shaped as to embrace the end part of the windshield glass 2, and an elastic bracket 13 which is made by cutting and raising a side part of the sandwiching portion 15 and which has a snug fit portion 14 formed by curling the fore end of the bracket 13. A windshield molding fixing member 6a is molded of an elastic material, and is provided with two grooves 8 and 10 for fixing the windshield molding 1, a groove 7 adapted to snugly fit the snug fit portion 14 of the sandwiching member 5a, and a press fit portion 12 capable of elastic deformation. The lower one 8 of the grooves for fixing the windshield molding 1 should desirably be formed with an engaging portion 9 with its inner end bent.

The windshield glass interposing member 5a is provided, by cutting and raising parts of the sandwiching portion 15, with a pair of holding portions 25 which abut against both sides of the windshield molding fixing member 6a and in which longitudinal guide grooves 23 are formed. Further, supporting arms 24 which slidably penetrate through the guide holes 23 of the holding portions 25 are protrusively provided to protrude on both the sides of the windshield molding fixing member 6a.

FIGS. 15 and 16 illustrate a design modification of the fifth embodiment. As shown in FIG. 16, a windshield interposing member 5n is provided with a pair of hook-shaped embracing and keeping portions 25' by cutting and raising parts of the sandwiching portion 15. As shown in FIG. 15, a windshield molding fixing member 6b is protrusively provided with abutting portions 24' on both sides thereof instead of the supporting arms 24 shown in FIG. 13.

The aspect of assemblage with the structure of the fifth embodiment will be explained. In order to attach a required number of windshield glass interposing members 5a to the peripheral edge of the windshield glass 2 at suitable intervals, the sandwiching portions 15 formed in the interposing members 5a are snugly put on the peripheral edge of the windshield glass 2. Subsequently, the interposing members 5a are set on the window frame 3 and are fixed by the bonding agent 4. Thereafter, the windshield molding fixing member 6a is snugly fixed through the groove 7 provided therein to the snug fit portion 14 at the fore end of the bracket 13 of the interposing member 5a, and the supporting arms 24 on both the sides of the fixing member 6a are caused to penetrate into the guide holes 23 of the holding portions 25, thereby to allow the windshield molding fixing member 6a to slide in the longitudinal direction of the guide holes 23 and to restrain it from moving in the direction perpendicular thereto by the holding portions 25. It is also possible that the interposing member 5a to which the windshield molding fixing member 6a is snugly fixed before fixing the windshield glass 2 to the window frame 3 by the bonding agent 4 is snugly put on the peripheral edge of the windshield glass 2.

In the fifth embodiment, the dimensional error at the attachment of the windshield molding fixing member 6a and the dimensional dispersions of the windshield glass 2 and the window frame 1 are absorbed by the elasicity of the bracket 13 and the sliding of the supporting arms 24 in the guide holes 23, and therewith, the windshield molding fixing member 6a is perfectly restrained and held by the guide holes 23 as well as the supporting arms 24 so as to be incapable of floating away from the surface of the windshield glass 2. As the result, the press fit portion 12 situated at one end of the windshield molding fixing member 6a is pressedly secured to the surface of the window frame 3 by the elastic force of the bracket 13 of the interposing member 5a, and the state of attachment is firmly held by the elastic deformation of the press fit portion 12 itself.

Further, the windshield molding fixing member 6a abuts against the outside surface of the windshield glass 2 at the upper end thereof and urges the windshield glass 2 in the bonding direction.

The windshield molding 1 is attached to the windshield molding fixing member 6a thus secured. That is, the windshield molding 1 is brought into engagement with the grooves 8 and 10 which are provided in the windshield molding fixing member 6a. The shape of the windshield molding fixing member 6a to which the windshield molding 1 is attached is as follows. The windshield molding 1 is bent so as to correspond to the bent engaging portion 9 formed at the inner end of the groove 8, whereby it is held in engagement with the engaging portion 9 and is restrained from coming off. Alternatively, the groove 8 is formed so that, by bringing the windshield molding 1 into engagement with the groove 10 at the fore end of the windshield molding fixing member 6a, the elasticity of the windshield molding fixing member 6a itself may act like a wedge against the coming-off of the windshield molding 1.

Also in the design modification of the fifth embodiment as shown in FIGS. 15 and 16, the mutual sliding is enabled by the engagement between the abutting portion 24' and the embracing and keeping portion 25', and the windshield molding fixing member 6b is restrained so as to prevent its upper end from floating away from the outside surface of the windshield glass 2.

As set forth above, according to the device of this invention, the windshield molding is mounted by the snug insertion in the grooves of the windshield molding fixing member. Therefore, the windshield molding is quite free from its contact with the window frame and the body surface, to prevent the contact noises and the flaws and attendant rust.

Owing to the engagement of the windshield molding with the engaging portion of the groove, the state of attachment is securely held. A further advantage is that the windshield glass is perfectly checked from floating off.

What is claimed is:

1. A device, for mounting a windshield molding of a bonded-type windshield, comprising:
   (i) an interposing member including
      (a) a holding portion adapted to support a windshield glass and to be secured to a window frame by a bonding agent, and
      (b) a snug fit portion integrally formed with the holding portion
   (ii) a fixing member including a first groove which receives said snug fit portion of said interposing member as a snug fit thereby to secure the fixing member to the interposing member, said fixing member including second groove means to receive and securely hold a windshield molding.

2. A device, as claimed in claim 1, wherein said holding portion is shaped to receive and sandwich an edge portion of a windshield glass, and wherein a resilient bracket having said snug fit portion is integrally formed with said holding portion.

3. A device, as claimed in claim 1, wherein said fixing member has opposed first and second surfaces, said first surface including said first groove, and said second surface including said second groove means as two grooves each adapted to receive a respective part of a windshield molding.

4. A device, as claimed in claim 1, wherein said holding portion includes a corrugated glass-supporting portion, and wherein said interposing member includes a pressing portion which abuts said fixing member and urges said fixing member into abutment with the glass such that the glass is held between the corrugated portion and the fixing member.

5. A device, as claimed in claim 1, wherein said fixing member has opposed first and second surfaces, said first surface including said first groove, said second surface including said second groove means as a single groove adapted to receive and secure a part of a windshield molding, said fixing member further including at said first surface a press fit portion which has a slot and a pressing portion to abut against a surface of the windshield glass.

6. A device, as claimed in claim 11, wherein said fixing member has opposed first and second surfaces, said first surface including said first groove, said second surface including said second groove means as a single groove adapted to receive and secure a part of a windshield molding, said fixing member further including at said first surface a pressing portion to abut against a surface of the windshield glass.

7. A device, as claimed in claim 1, wherein said fixing member has opposed first and second surfaces, said first surface including said first groove, and said second surface including said second groove means as two grooves each adapted to receive a respective part of a windshield molding, said fixing member further including at said first surface a press fit portion having a slot.

8. A device, for mounting a windshield molding of a bonded-type windshield, comprising:
   (i) an interposing member
   (ii) a fixing member
   said interposing member including:
      (a) a holding portion adapted to support a windshield glass and to be secured to a window frame by a bonding agent,
      (b) a snug fit portion integrally formed with the holding portion, and
      (c) a restraining means which engages with said fixing member to restrain said fixing member against movement along the edge of the windshield glass whilst permitting said fixing member to move transversely to the edge of the glass,
   said fixing member including
      (d) an engaging portion to secure the windshield molding,
      (e) a portion to form a snug fit with the snug fit portion of the interposing member, and
      (f) a portion for engagement by said restraining portion so as to be slidable relative thereto transversely to the edge of the glass.

9. A device, as claimed in claim 8, wherein said fixing member has opposed first and second surfaces, said fixing member having at said first surface a groove to receive as a snug fit the snug fit portion of the interposing member, said fixing member having at said second surface two grooves to receive respective parts of a molding, said fixing member further having supporting arms extending at both sides thereof, and wherein said holding portion receives and sandwiches an edge portion of the windshield glass, the snug fit portion being formed at an end of an elastic bracket integral with the holding portion, and wherein the restraining means includes longitudinal guide holes receiving the supporting arms slidably therein.

10. A device, as claimed in claim 8, wherein said fixing member has opposed first and second surfaces, said fixing member having at said first surface a groove to receive as a snug fit the snug fit portion of the interposing member, said fixing member having at said second surface two grooves to receive respective parts of a molding, said fixing member further having abutting portions extending at both sides thereof, and wherein said holding portion receives and sandwiches an edge portion of the windshield glass, the snug fit portion being formed at the end of an elastic bracket integral with the holding portion, and wherein the restraining means is a pair of embracing and keeping portions which embrace said abutting portions slidably.

* * * * *